US006847323B2

(12) United States Patent
Lai

(10) Patent No.: US 6,847,323 B2
(45) Date of Patent: Jan. 25, 2005

(54) REMOTE CONTROLLER

(75) Inventor: Aling Lai, Taichung (TW)

(73) Assignee: Thunder Tiger Corporation, Taichung (TW)

(*) Notice: Subject to any disclaimer, the term of this patent is extended or adjusted under 35 U.S.C. 154(b) by 239 days.

(21) Appl. No.: 09/888,196

(22) Filed: Jun. 25, 2001

(65) Prior Publication Data

US 2002/0196174 A1 Dec. 26, 2002

(51) Int. Cl.[7] .......................... G08C 19/12; H04L 17/02
(52) U.S. Cl. ....................................... 341/176; 446/454
(58) Field of Search .......................... 341/176; 446/454, 446/456, 460; 473/212, 213; 180/6.2, 7.1, 218

(56) References Cited

U.S. PATENT DOCUMENTS 5,094,646 A * 3/1992 Marceau ..................... 446/491
5,127,658 A * 7/1992 Openiano .................... 463/50
5,195,920 A * 3/1993 Collier ....................... 446/409
6,113,459 A * 9/2000 Nammoto ................... 446/454

* cited by examiner

*Primary Examiner*—Timothy Edwards
(74) *Attorney, Agent, or Firm*—Rosenberg, Klein & Lee

(57) ABSTRACT

A remote controller has a body and a seat. A holding portion is between the body and the seat for being held by a hand of a user. The body is installed with a trigger and a rotary wheel for being held and operated by two hands of the user. The trigger is installed at an intersection of the body and the holding portion. The rotary wheel is installed on the body facing toward a lateral surface of the user. An angle is formed between an axial line of the rotary wheel and a moving direction of the trigger, wherein the angle is larger than 90 degrees.

1 Claim, 4 Drawing Sheets

REMOTE CONTROLLER

FIELD OF THE INVENTION

The present invention relates to a controller, and especially to a remote controller, as the user operate it, the hands and body of the user can be retained in a steady pose and thus the remote controller is controlled well.

BACKGROUND OF THE INVENTION

Referring to FIG. 4, a remote controller 9 dedicated in a remote controlling car is illustrated. The remote controller 9 has a body 91. The body 91 is installed with a rotary wheel 92 for controlling the direction of the remote controlling car. The body 91 is further installed with a trigger 93 so that the finger of the user may touch the trigger 93 to control the speed of the remote controlling car. When the user uses the remote controller 9, the user can hold the rotary wheel 92 by one hand and touch the trigger 93 by another hand. When the user rotates the rotary wheel 92, the car will rotate. If the user operates the trigger 93, the remote controlling car will change speed.

With reference to FIG. 5, when the user operates the remote controller, especially in the competition, the user's hands and body often rotates with the direction of the remote controlling car automatically. Furthermore, the two arms of the user will tightly clamp the body due to concentration. However, since the axial line M of the rotary wheel 92 is vertical to the body 91, when two hands of the user hold the rotary wheel 92 and the trigger 93, and the two arms tightly clamps the body 91, to match the vertical angle formed between the rotary wheel 92 and the body 91, the wrist of the right hand will be formed with an unnatural pose (see that indicated by arrow A), therefore, the rotary wheel 92 can not be well controlled.

Furthermore, since in general, this kind of remote controllers 9 are analog remote controllers, i.e., the user is only necessary to rotate the rotary wheel 92 with a small extent, the remote controlling car may shift through a large angle. Therefore, the user must control the remote controller 9 precisely for control the remote controlling car to move along the user's desired direction. Since two hands of the user must match the vertical angle between the axial line M of the rotary wheel 92 and the body 91, as the user rotates the rotary wheel 92, the wrists and fingers of the user become dull, thereby the remote controller 9 can not be controlled well.

Besides, as shown in FIG. 6, the user may extend his two hands forwards so that the wrists have a comfortable pose, but this will induce a larger distance D between the remote controller 9 and the body 91, and moreover, the arms can not move near the body (as that indicted by the double arrows), namely, two arms of the user are held in higher position, the remote controller 9 can not be operated steadily. Therefore, the prior art remote controller 9 is necessary to be improved.

SUMMARY OF THE INVENTION

Accordingly, the primary object of the present invention is to provide a remote controller, wherein when the user operates the rotary wheel and trigger by the two hands thereof at the same time, the user may retain at a nature pose. Therefore, as the user operates the remote controller, the user has an optimum control effect. By the design of the present invention, the two arms of the user may adhere on the body so as to be supported thereon, and thus the remote controller is held steadily without vibration, and therefore, the remote controller is well controlled.

To achieve above objects, the present invention provides a remote controller has a body and a seat. A holding portion is between the body and the seat for being held by a hand of a user. The body is installed with a trigger and a rotary wheel for being held and operated by two hands of the user. The trigger is installed at an intersection of the body and the holding portion. The rotary wheel is installed on the body facing toward a lateral surface of the user. An angle is formed between an axial line of the rotary wheel and a moving direction of the trigger, wherein the angle being larger than 90 degrees.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
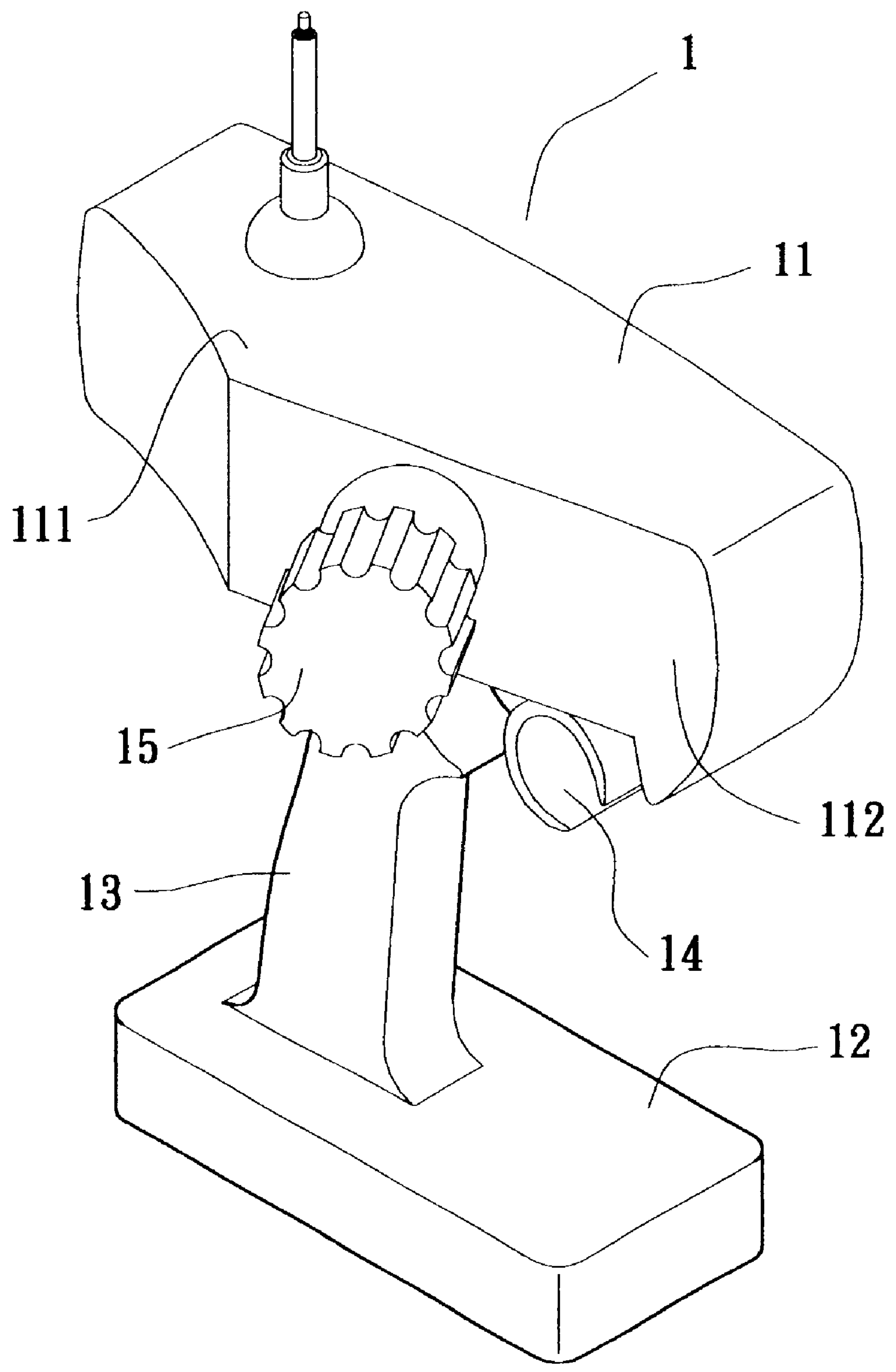
FIG. 1 is a perspective view of the present invention.
Figure 2:
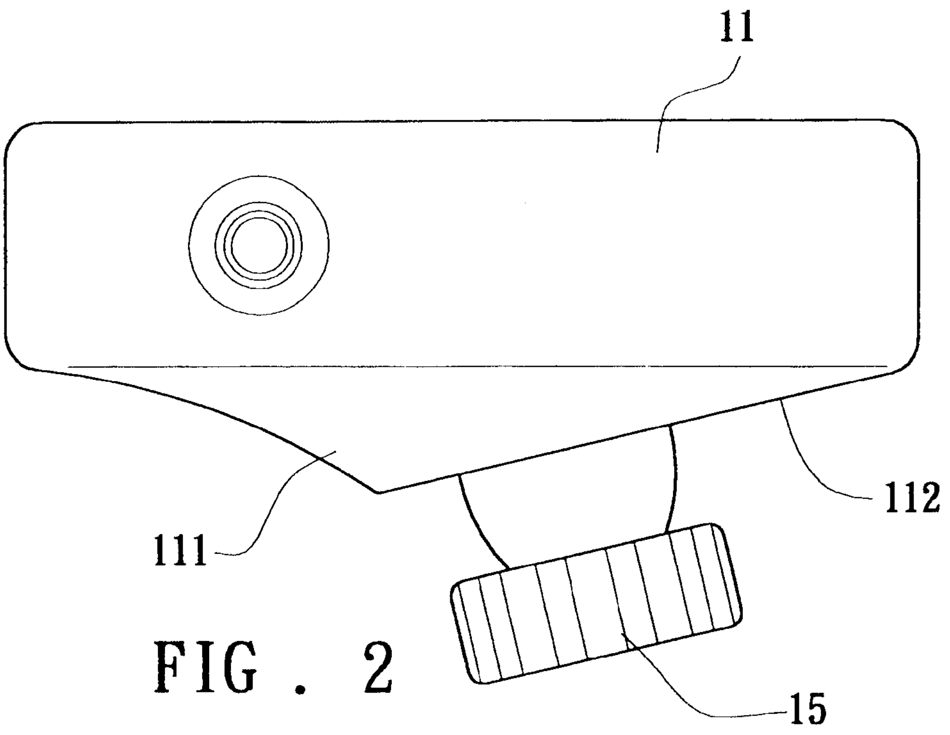
FIG. 2 is an elevation view of the present invention.
Figure 3:
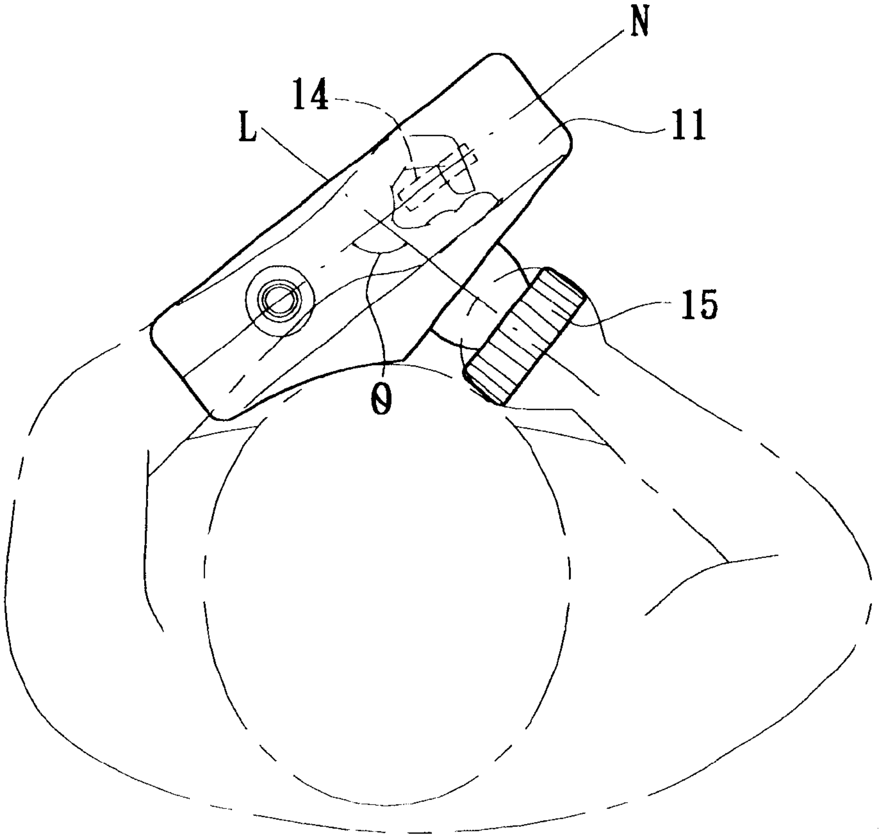
FIG. 3 is an elevation view showing a user being using the present invention.
Figure 4:
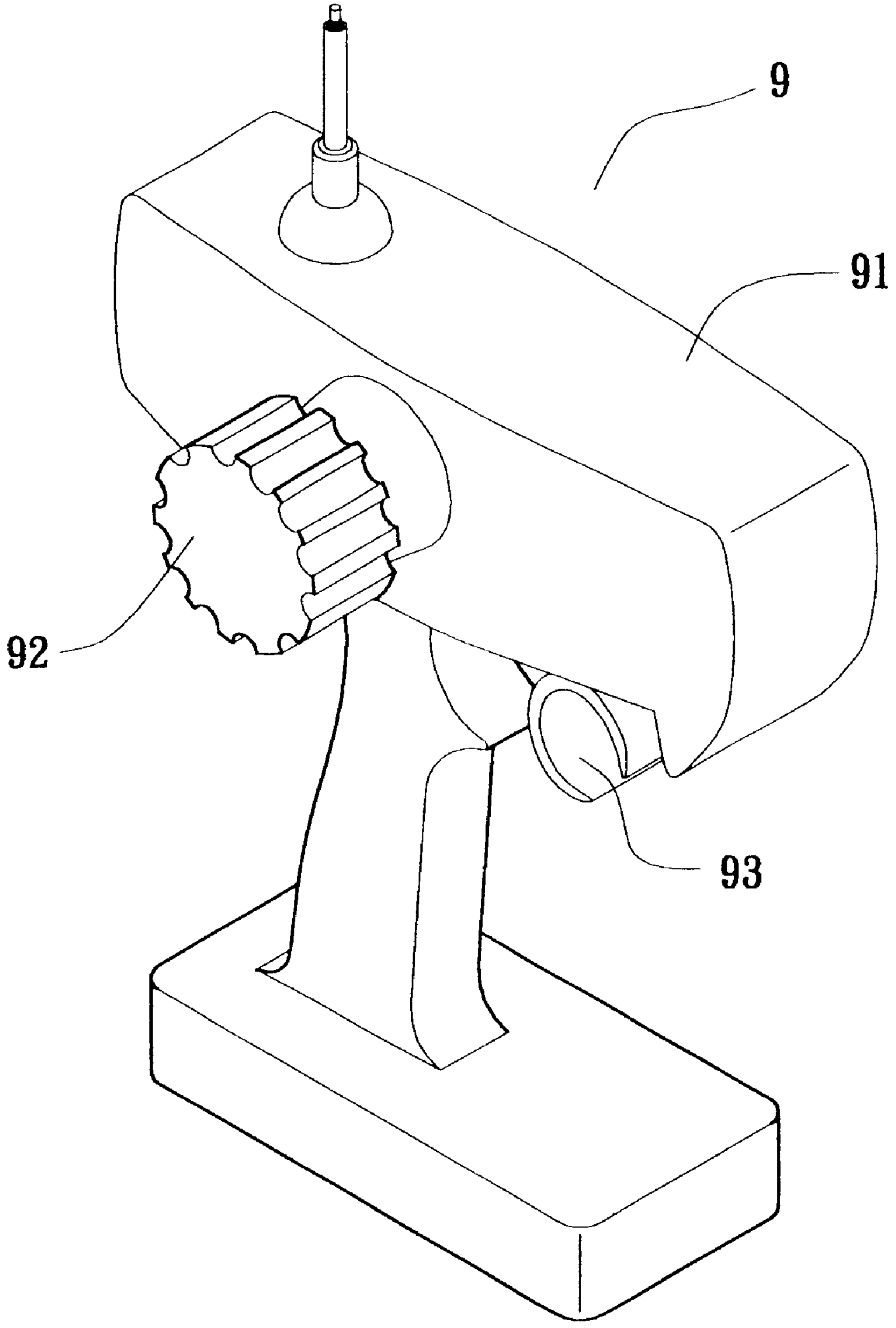
FIG. 4 PRIOR ART
FIG. 4 is a perspective view of a prior art remote controller.

Referring to FIGS. 1 to 3, a remote controller 1 of the present invention is illustrated. The remote controller 1 has a body 11 and a seat 12. A holding portion 13 is connected between the body 11 and the seat 12 for being held by the user. The intersection of the body 11 and the seat 12 is installed with a trigger 14. Thereby the user may hold the holding portion 13 by one hand, and then the finger of the hand may operate the trigger 14 for controlling the speed of the remote controlled car.

When the user holds the holding portion 13, the body 11 is extended with a protrusion 111 toward the user. The protrusion 111 has a tilt surface 112. The surface 112 is installed with a rotary wheel 15. The axial line L of the rotary wheel 15 is not perpendicular to the moving direction N of the trigger 14. Namely, the angle between the axial line L and the trigger 14 are larger than 90 degrees. Ideally, the angle $\theta$ is between 105 degrees to 115 degrees.

Figure 5:
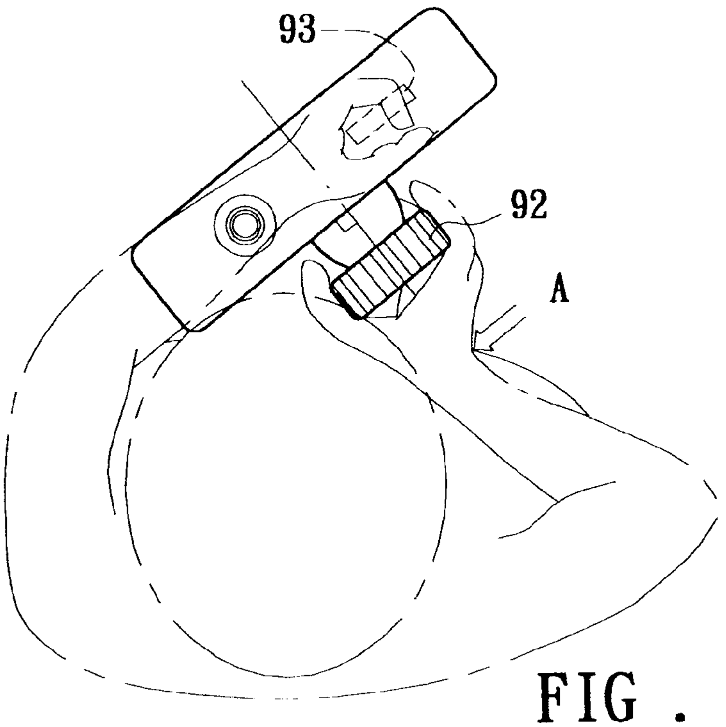
FIG. 5 PRIOR ART
FIG. 5 is an elevation view showing a user being using a prior art remote controller 9.
Figure 6:
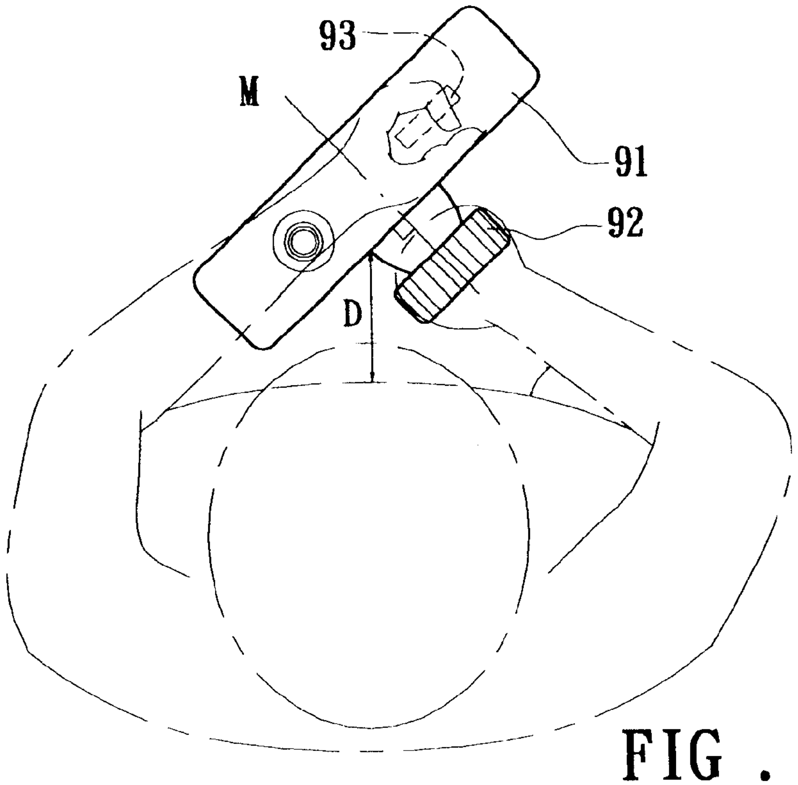
FIG. 6 PRIOR ART
FIG. 6 is another elevation view showing a user being using a prior art remote controller 9.

When the user operates the remote controller 1, the left hand holds the holding portion 13, and at the same time, a finger touch the trigger 14. Then the right hand controls the rotary wheel 15, as illustrated in FIG. 3. It can discover from the elevation view that the body has a flat shape, and therefore, when two hands of the user places in front side of the body, the angle between two extending hands is larger than 90 degrees. Since in the present invention, the axial line L of the rotary wheel 15 and the direction N of the trigger 14 has a tilt angle θ matching to the requirement of ergonomics. Therefore, when the user operates the rotary wheel 15 and trigger 14 by the two hands thereof at the same time, the user may retain at a nature pose. Therefore, as the user operates the remote controller 1, the user has an optimum control effect. Besides, comparing FIGS. 3 and 5, it will discover that by the design of the present invention and the angle θ, the two arms of the user may adhere on the body so as to be supported thereon, and thus the remote controller 1 is held steadily without vibration.

Besides, since the tilt angle θ formed by the axial line L will cause the user to hold the rotary wheel 15 with an ideal pose, the fingers and wrist may operate freely and skillfully as rotating the rotary wheel 15. Therefore, the preciseness for controlling the car can be increased greatly, and thus a model car can be controlled precisely.

The present invention are thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A remote controller having a body and a seat, a holding portion being between the body and the seat for being held by a hand of a user, the body being installed with a trigger and rotary wheel for being held and operated by two hands of the user; the trigger being installed at an intersection of the body and the holding portion; a protrusion extending from the body facing to the user and having a tile surface, the rotary wheel being installed on the tile surface of the protrusion and facing toward a lateral surface of the user; an angle being formed between an axial line of the rotary wheel and a moving direction of the trigger, wherein the angle is larger than 90 degrees.

* * * * *